(12) United States Patent
Baratta

(10) Patent No.: US 11,351,699 B2
(45) Date of Patent: Jun. 7, 2022

(54) CIRCULAR BLADE CORES WITH REMOVABLE SECTIONS AND METHODS OF ASSEMBLY AND USE

(71) Applicant: Baron Investments, LLC, Oxnard, CA (US)

(72) Inventor: Anthony Baratta, Oak Park, CA (US)

(73) Assignee: BARON INVESTMENTS, LLC, Oxnard, CA (US)

( * ) Notice: Subject to any disclaimer, the term of this patent is extended or adjusted under 35 U.S.C. 154(b) by 0 days.

(21) Appl. No.: 17/160,383

(22) Filed: Jan. 28, 2021

(65) Prior Publication Data

US 2021/0394396 A1 Dec. 23, 2021

Related U.S. Application Data

(63) Continuation of application No. 16/077,458, filed as application No. PCT/US2017/017844 on Feb. 14, 2017, now Pat. No. 10,913,180.

(60) Provisional application No. 62/295,143, filed on Feb. 14, 2016.

(51) Int. Cl.
| | |
|---|---|
| *B28D 1/12* | (2006.01) |
| *B23D 61/02* | (2006.01) |
| *B24D 5/06* | (2006.01) |
| *B24D 5/12* | (2006.01) |

(52) U.S. Cl.
CPC .......... *B28D 1/122* (2013.01); *B23D 61/023* (2013.01); *B23D 61/026* (2013.01); *B24D 5/06* (2013.01); *B24D 5/123* (2013.01); *Y10T 83/9326* (2015.04)

(58) Field of Classification Search
CPC ............. Y10T 83/9319; Y10T 83/9321; Y10T 83/9326; Y10T 83/9329; Y10T 83/9331; Y10T 83/9338; Y10T 83/9362; Y10T 83/9365; Y10T 83/9367; B28D 1/22; B23D 61/023; B23D 61/026; B23D 61/12; B23D 61/02; B23D 61/025; B23D 61/04; B23D 61/06; B23D 61/065; B24D 9/02; B24D 5/06; B24D 5/123; B24B 5/40
USPC ....... 125/13.01, 15; 451/548, 541, 542, 546, 451/547
See application file for complete search history.

(56) References Cited

U.S. PATENT DOCUMENTS

| | | | |
|---|---|---|---|
| 299,142 A | | 5/1884 | Hilton |
| 523,862 A | * | 7/1894 | Newton |
| 646,284 A | | 3/1900 | Hilton |
| 869,574 A | | 10/1907 | Huther |

(Continued)

FOREIGN PATENT DOCUMENTS

| | | |
|---|---|---|
| EP | 0605850 | 12/1993 |
| WO | WO 2017031091 | 2/2017 |
| WO | WO 2017/139810 | 8/2017 |

OTHER PUBLICATIONS

Leck, Kong-Meng, International Search Report, dated May 15, 2017, 9 pages, Australian Patent Office, Woden ACT, Australia.

(Continued)

*Primary Examiner* — Phong H Nguyen
(74) *Attorney, Agent, or Firm* — Henricks Slavin LLP

(57) ABSTRACT

Tool cores may have removable sections, which may be removable without damaging, cutting or severing attachment configurations for the removable sections. The removable sections may be handled simultaneously. Moving parts used to facilitate removal of the removable sections may be secured in a pre-loaded configuration.

18 Claims, 7 Drawing Sheets

(56) References Cited

U.S. PATENT DOCUMENTS

| | | |
|---|---|---|
| 1,306,741 A | 6/1919 | Blanchard |
| 4,589,458 A | 5/1986 | McCord, Jr. |
| 5,392,758 A | 2/1995 | Rognon |
| 5,761,981 A | 6/1998 | Stoffels |
| 8,807,938 B2 | 8/2014 | Villella |
| 10,913,180 B2 | 2/2021 | Baratta |
| 2008/0251061 A1 | 10/2008 | Baratta |
| 2008/0286103 A1 | 11/2008 | Gajewski et al. |
| 2010/0058917 A1 | 3/2010 | Scandroglio et al. |
| 2010/0132052 A1 | 5/2010 | Saito |
| 2012/0132052 A1 | 5/2012 | Chen |
| 2013/0217315 A1* | 8/2013 | Wiand .................. B24D 5/06 51/297 |
| 2019/0030754 A1 | 1/2019 | Baratta |

OTHER PUBLICATIONS

Leck, Kong-Meng, Written Opinion, dated May 15, 2017, 8 pages, Australian Patent Office, Woden ACT, Australia.

* cited by examiner

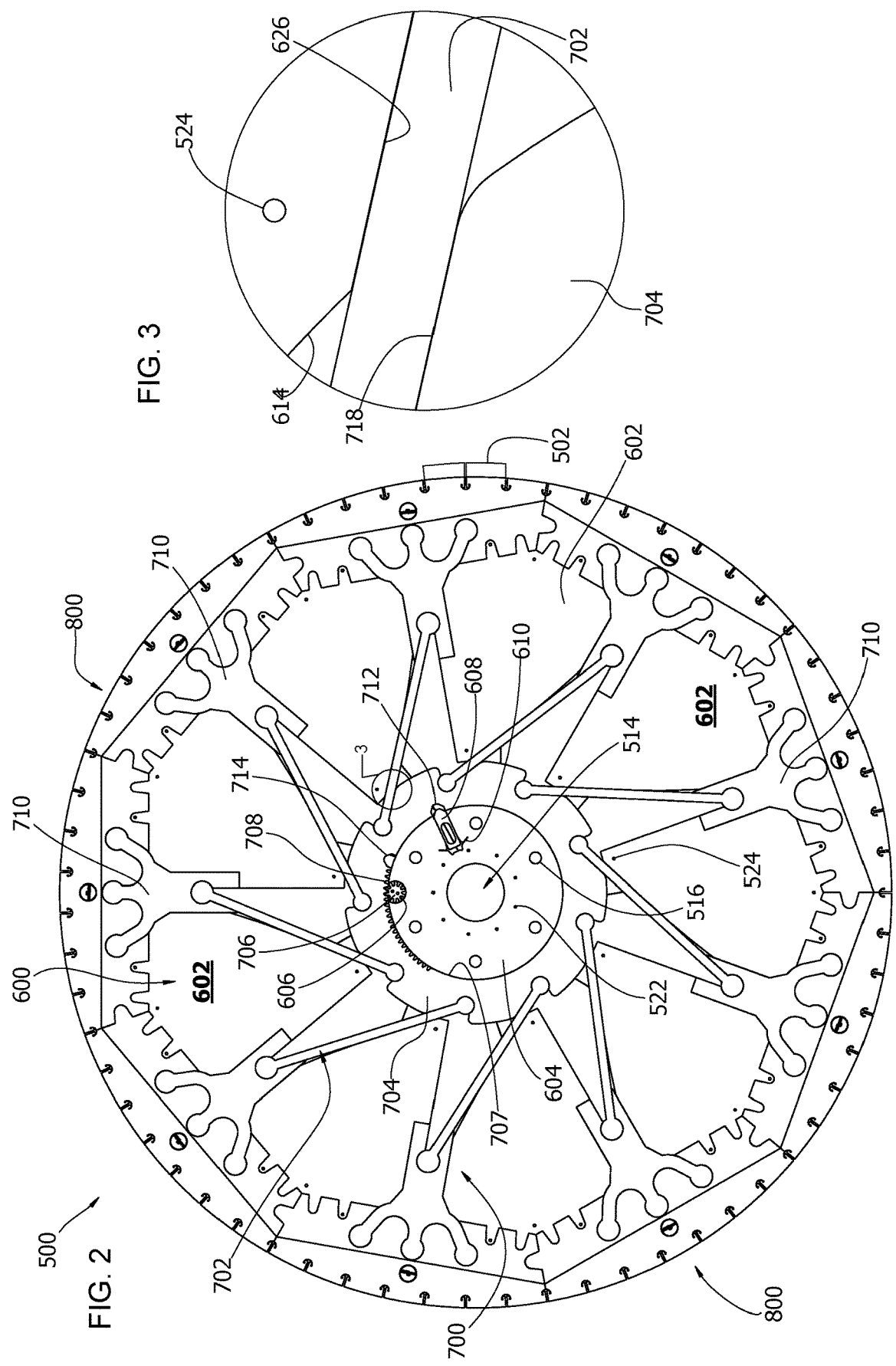

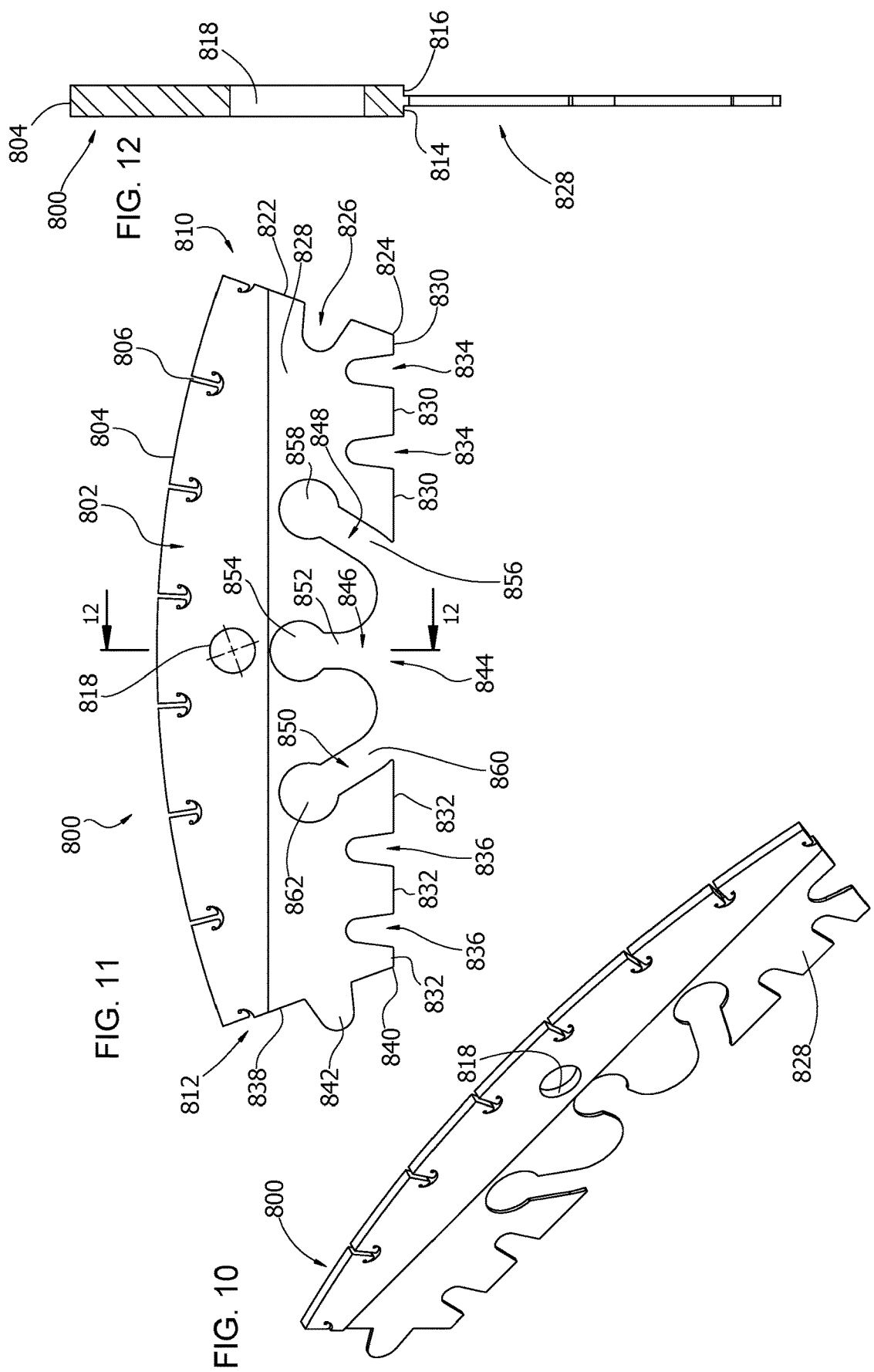

CIRCULAR BLADE CORES WITH REMOVABLE SECTIONS AND METHODS OF ASSEMBLY AND USE

CROSS REFERENCE TO RELATED APPLICATIONS

This application is a Continuation of Ser. No. 16/077,458, filed Aug. 11, 2018, which is a 35 USC 371 National Stage of International Application No. PCT/US17/17844, filed Feb. 14, 2017, which claims priority to Provisional Patent Application No. 62/295,143 filed Feb. 14, 2016, the entire contents of all of which are incorporated herein by reference.

BACKGROUND

Field

These inventions relate to tool cores, for example laminated tool cores or cutting blade cores, and components therefor, such laminated tool cores or cutting blade cores may include circular saw blade cores, including blade cores used in cutting stone or concrete.

SUMMARY

Tool cores, for example tool cores for cutting blades, are described and can have a number of configurations. In one example of a tool core, the tool core can include a laminate with movable components within the laminate. In one configuration, the movable components may be ones that can be moved from a first configuration to a second configuration and back again. In one example, the movable components include linkages between a first component and a second component. In one configuration, a first component is a control component, and one or more second components are controlled components. In one example, the control components move the controlled components through one or more linkages, for example where the control components move the linkages to disengage the controlled components from a portion of the tool core and/or move the linkages to engage the controlled components with a portion of the tool core. In one example, a gear is a control component that moves a plurality of controlled components in the form of carriers for removable sections by way of a respective plurality of linkages. Linkages can be supported within a laminated structure and allowed to move, for example to permit engagement and disengagement of carriers for working components such as cutting segments or cutting tips. Carriers such as those for working components can also be configured to move and/or be supported within a laminated structure.

In any of the foregoing examples and configurations, tool cores may be configured to have removable and/or replaceable carriers or sections for carrying one or more working elements such as cutting segments. For example, the carriers can be configured to be removable in a non-destructive way. In the present document, "non-destructive" is defined as not damaging, and for example includes not cutting and not breaking. In one configuration, the carriers can engage a portion of the core by lateral movement, for example in a direction parallel to an axis of rotation of the tool, and may include components that interengage with complementary components in the portion of the core. In another configuration, the carriers can engage a portion of the core by planar movement, for example movement within a plane parallel to the core, for example to engage one or more complementary surfaces in corresponding components in the core.

In any of the foregoing examples or configurations of tool cores, the tool cores can include multiple parts that are movable simultaneously, for example movable within a laminate forming the core. In one configuration, the multiple parts are movable simultaneously, for example by operation of a control element, in one example a control gear, or movable as a result of inter-engagement and cause and effect. In another configuration, the multiple parts are movable simultaneously as linkages with respective retaining elements for carriers, in one example carriers for working elements such as cutting segments. In one example, the multiple parts can be carriers that are movable simultaneously to engage with or to displace from corresponding portions of the tool core. In one configuration, the multiple parts are carriers for cutting segments that can move into engagement with complementary portions of the tool core, for example by way of linkages, and that can move out of engagement with the respective complementary portions of the tool core. Movement out of engagement with the core or displacement from the core may be used to allow removal of the carriers, including removal of the carriers for replacement by other carriers.

In any of the foregoing examples or configurations of tool cores, the tool core can be configured to permit simultaneous movement and interlocking or inter-engagement of adjacent parts. In one configuration, a plurality of carriers can be arranged to interengage with respective components on the tool core such that when the plurality of carriers are simultaneously moved toward each other, they eventually contact and in at least one example interengage with adjacent ones of the carriers, simultaneous with their movement toward each other. In such a configuration, the carriers can become interengaged, and such inter-engagement can be used to secure adjacent carriers to one another and to secure carriers to the core, such as by way of their inter-engagement with respective components on the tool core. Such movement can be carried out with multiple groups of adjacent carriers, and where multiple groups of adjacent carriers form a part or a complete perimeter of the core, each individual carrier helps to secure others or all of the carriers along the perimeter through the securement of the individual carrier with the core. In some configurations of such interengaging carriers, a single component or a relatively few components can be used to secure all of the carriers relative to the core.

In any of the foregoing examples or configurations of tool cores, a gear can be used for moving parts associated with the tool core. In one configuration, a gear can be used to move one or more linkages associated with the core to move other components in the core. For example, the gear can be used to move linkages in the core to move carriers for working components relative to the core, for example to engage or disengage the carriers relative to the core. In one configuration, turning of the gear can engage one or more carriers with the core or disengage one or more carriers from the core. In another configuration, securement or locking of the gear relative to the core can also secure our lock other components in the core. For example, locking the gear can lock or secure one or more carriers to the core.

In any of the foregoing examples or configurations of tool cores, a gear can be included in a tool core in such a way that the gear is operable in conjunction with the tool core without the gear having a shaft supporting and/or moving the gear within the tool core. In one configuration, the tool core is a laminate and contains a gear within the laminate and supported within the laminate. The gear is supported within the laminate without a supporting shaft. The gear can be used to move one or more components in the tool core, for example linkages in the tool core.

In any of the foregoing examples or configurations of tool cores, a gear can be included in a tool core such as a tool core having a laminated structure, where the gear is supported within a cavity. The cavity can be used to reliably position the gear for operation. In one example, a gear is supported in a cavity formed in an interior of the core component or in a medial core component.

In any of the foregoing examples or configurations of tool cores, a plurality of components of a tool core can be configured so as to provide nested or serially linked or inter-engaging load bearing surfaces. In one configuration, a plurality of components are arranged so that a plurality of structures fall on a radius of a core so that loading on an outer perimeter of the core is transmitted to a shaft on which the core is supported. In such a configuration, a component such as a working element, for example a cutting segment, positioned against a perimeter portion of the core is supported by the perimeter portion of the core through the nested components all the way to the shaft supporting the core.

In any of the foregoing examples or configurations of tool cores, one or more components forming a core can be preloaded. Preloading of one or more components can serve a number of functions, including biasing parts in a given configuration or direction, locking components in a desired configuration, reducing the effect of anticipated loading during operation, among other functions. Preloading can be carried out in one example by translating one or more components beyond a relaxed, resting, unstressed or unloaded configuration or beyond a relaxed, resting, unstressed or unloaded position.

The removable carriers, including removable carrier configurations that can be used with any of the foregoing examples or configurations of tool cores, include outer or distal surfaces forming, or capable of receiving components forming, working structures for working a workpiece. The outer or distal surfaces are configured so as to permit the removable carrier to join with the tool core for producing a working surface having the desired configuration, for example a circular cutting surface, a longitudinal or linear cutting surface, or the like. The removable carriers also include inner or proximal surfaces for engaging a complementary surface or surfaces on a tool core. The inner or proximal surfaces can take a number of configurations, generally consistent with the variety or number of configurations that can be incorporated into a complementary surface configurations on the tool core. In one example, the inner or proximal surface of the removable carrier is configured so that engagement with the complementary surface on the tool core limits or restricts movement of the removable carrier in the plane of the tool core, for example toward and away from the support portion, and/or laterally in either direction relative to the support portion. The removable carrier is configured to permit movement of the removable carrier out of the plane of the tool core, in one direction or the other relative to a plane of the tool core. In one example, the removable carrier includes a support structure having a plurality of openings, extending in the plane of the support structure, wherein at least two of the openings extend in the plane of the support structure nonparallel to each other, in one example for engaging a movable element in the tool core. In another example, the removable carrier includes a support structure having a plurality of openings and wherein at least one of the openings includes a linearly-extending portion and a circular or polygonal portion, for example at the end of the linearly-extending portion. Alternatively or additionally, the removable carrier includes a support structure having first and second openings extending in a direction parallel to each other, for example for engaging complimentary structures in the tool core. Alternatively or additionally, a removable carrier includes a support structure having opposite end portions having first and second respective geometries complementary to each other, for example so that a first geometry on a first removable carrier can engage the second complementary geometry on a second removable carrier adjacent the first removable carrier.

One way of using a tool core, in one example a cutting blade, includes moving one or more components in the tool core for positioning one or more components for operation. In one configuration, the one or more components being moved include at least one internal to a laminate of the core. In another configuration, the one or more components being moved include linkages between a moving or driving element and a movable or driven element, for example between a gear for moving linkages and a carrier being moved by the linkages. In an example of moving one or more components in the tool core, at least one component is positioned in an interior portion of the core and extends outward to a perimeter portion of the core, and the at least one component can be moved from a first position to a second position and back again.

In another process for using a tool core, in one example a process for using a cutting blade, a removable component can be assembled into the core and can be removed from the core nondestructively or without damaging components of the core. In one example, a carrier for a working component of the tool can be assembled into the core and secured in place for normal operation, and can be disengaged from the core and removed, for example to be replaced by another carrier, or to be repaired, or for other reasons. For example, a carrier for a working component may be a removable carrier for cutting segments, where the carrier may be secured in place on the core for normal operation and disengaged from the core and removed as desired. In one configuration, a removable component can be assembled into the core by interengaging the removable component with the core in a first direction, and then moving the assembly into engagement with the core in a second direction. In one example, the removable component can be a cutting segment carrier or carrier for other working element, and moved laterally into engagement with a complementary surface on an element of the core. The carrier can then be moved inwardly of the core to be secured in place and supported by the core. To remove the carrier, the process is reversed, for example moving the carrier outwardly of the core so that the carrier is free to move laterally, and then moving the carrier laterally to disengage the carrier from the core.

In any of the foregoing processes, multiple components can be moved into position on the core, and adjacent ones of the components can be configured to interlock or interengage with each other so that they are secured in place on the core. In one example, as adjacent components are moved into position on the core, they interlock or inter-engage with their adjacent components, for example with a tongue and groove arrangement, or other complementary and/or mutually supporting geometries. In another example where movable components will form a continuous perimeter configuration, interlocking or interengaging components can help to secure all of the components in place on the tool core.

In any of the foregoing processes, the movements of components, for example movements of linkages, carriers, and other core components, can occur simultaneously or as a result of linkages, contact or engagements. In one example, the movements of the components can occur simultaneously by operation of a single component, for example by operation of a drive element, a control element, or other device for operating or causing the movements of the components. In one configuration, the movements of the components can be carried out by a gear arrangement, and/or linkages configured to move the components. Simultaneous movement of components makes easier the inter-engagement or interlocking of one or more components with each other and/or with respective portions of the tool core. This process may also help to more securely maintain the components in place during normal operation to withstand expected loading during operation.

In any of the foregoing processes, a gear can be used to move one or more components relative to the core, including components within a core laminate when the core includes a laminated structure, and can also be used to position components as desired, both spatially and structurally. In one example, a gear can be used to move linkages, including simultaneously, and can be used to position removable components relative to the core. In another example, a gear can be used to not only position components relative to the core, but also to place one or more components in a preload condition or in a prestressed condition to provide a desirable structural configuration.

In any of the foregoing processes, a tool core can be configured so that one or more components are positioned in a pre-load or prestressed condition, as desired, relative to a relaxed, unloaded, unstressed or similar state. In one configuration, one or more components in the tool core are pressed into engagement with an adjacent component so as to apply a load to the adjacent component. In another configuration, one or more components in the tool core are preloaded and maintained in such preloaded condition, for example by locking or latching the component in place under load. In one example, a component in the tool core is placed under load and then locked or latched in place, for example by a slide, pin, latch, pawl or other securement. In another configuration, for example where the tool core is a round tool core, one or more components in the tool core can be placed under load such that an additional load applied radially inward would tend to maintain the components in the tool core in place.

These and other examples are set forth more fully below in conjunction with drawings, a brief description of which follows.

BRIEF DESCRIPTION OF THE DRAWINGS

FIG. 2 back plan view of the tool core of FIG. 1 with an outer laminar layer and adhesive layer removed.

FIG. 3 is a detail view of a portion of the tool core of FIG. 2 taken at 3.

FIG. 10 is an upper isometric view of a carrier for use with the tool core of FIG. 1.

FIG. 11 is a plan view of the carrier of FIG. 10.

FIG. 12 is a transverse cross-section of the carrier of FIG. 11 taken along 12-12.

DETAILED DESCRIPTION

Figure 1:
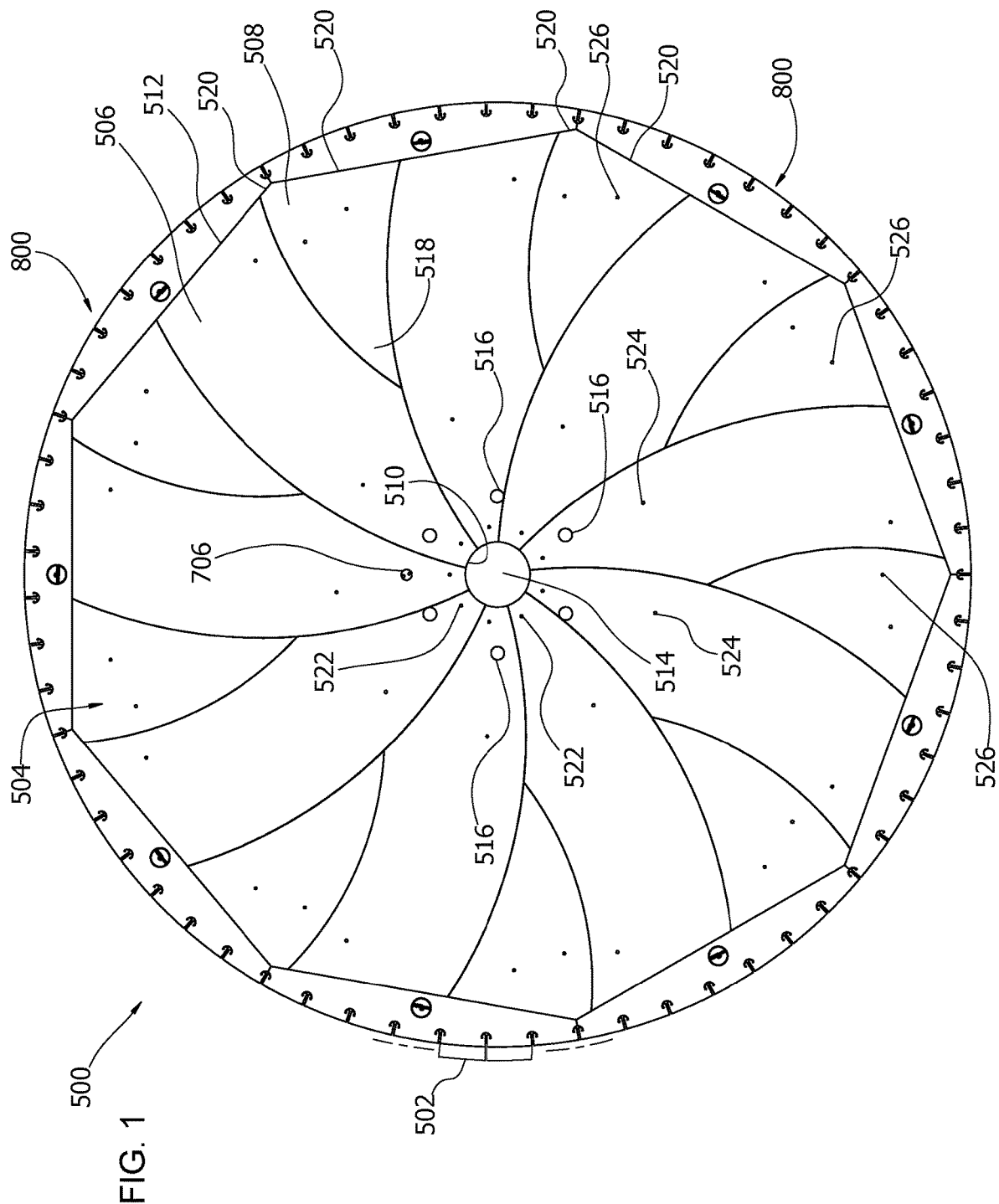
FIG. 1 is a front plan view of a tool core in the form of a circular saw blade core in accordance with one example described herein.

This specification taken in conjunction with the drawings sets forth examples of apparatus and methods incorporating one or more aspects of the present inventions in such a manner that any person skilled in the art can make and use the inventions. The examples provide the best modes contemplated for carrying out the inventions, although it should be understood that various modifications can be accomplished within the parameters of the present inventions.

Examples of tool cores and of methods of making and using the tool cores are described. Depending on what feature or features are incorporated in a given structure or a given method, benefits can be achieved in the structure or the method. For example, tool cores using removable cutting or abrading sections may allow a tool core to have a longer lifetime. They may also permit more diverse applications, for example use of the tool core for a wider number of applications. Cutting tool cores may have improved repair rates and lower repair times. Additionally, some cutting tool core configurations may also benefit from lower usage costs and/or lifetime costs.

In some configurations of cutting tool cores, improvements can be achieved also in repair and replacement. In applications where the core is used multiple times after repairing and replacing cutting elements, improvements can make easier replacement of such cutting elements. For example, cutting elements can be removed without breaking or cutting components to disengage the cutting elements from the core, for example by moving components and disengaging sections from the core where the sections carry cutting elements. Additionally, cutting elements can be slipped or moved into position in conjunction with the core by moving sections carrying the cutting elements into engagement with one or more components of the core.

In cutting tool cores providing for replaceable cutting sections, such as where the cutting sections carry cutting elements that are applied to workpieces, replaceable cutting sections allow providing for a larger number of final configurations for the given blade core configuration. For example, replaceable cutting sections allow changes in overall blade diameter, changes in cutting width, and changes in cutting type, or other characteristics. For example, the cutting type can be changed between a carbide cutting element to a diamond cutting element, or change from one diamond cutting configuration to another.

These and other benefits will become more apparent with consideration of the description of the examples herein. However, it should be understood that not all of the benefits or features discussed with respect to a particular example must be incorporated into a tool core, component or method in order to achieve one or more benefits contemplated by these examples. Additionally, it should be understood that features of the examples can be incorporated into a tool core, component or method to achieve some measure of a given benefit even though the benefit may not be optimal compared to other possible configurations. For example, one or more benefits may not be optimized for a given configuration in order to achieve cost reductions, efficiencies or for other reasons known to the person settling on a particular product configuration or method.

Examples of a number of tool core configurations and of methods of making and using the tool cores are described herein, and some have particular benefits in being used together. However, even though these apparatus and methods are considered together at this point, there is no requirement that they be combined, used together, or that one component or method be used with any other component or method, or combination. Additionally, it will be understood that a given component or method could be combined with other structures or methods not expressly discussed herein while still achieving desirable results.

As used herein, "substantially" shall mean the designated parameter or configuration, plus or minus 10%. However, it should be understood that terminology used for orientation or relative position, such as front, rear, side, left and right, upper and lower, and the like, are used in the Detailed Description for ease of understanding and reference, and are not used as exclusive terms for the structures being described and illustrated.

Tool cores for supporting working elements to be used on workpieces can be configured to be reusable, for example by permitting easy replacement of the working elements. Round or circular tool cores with their working to elements have a number of applications, including cutting wood, stone, concrete, asphalt and other materials. Working elements for use with such tool cores include carbide tips, diamond segments (for example sintered diamond matrices), continuous diamond surfaces, and other elements.

In one example of a tool core for supporting working elements, a tool core 500 (FIGS. 1-4 and 6-7) is a round or circular tool core for supporting working elements 502. In the configuration shown in FIGS. 1 and 2, the working elements are shown schematically as representing cutting segments, such as diamond matrix cutting segments, and a plurality are positioned around a perimeter of the tool core forming a working perimeter for the tool, in the present example forming a complete circular perimeter for the core. However, it is understood that any number of working elements 502 can be applied to the tool core, as desired. Additionally, the working elements 502 can be incorporated into the tool core assembly during assembly of the tool core itself, or can be added later. The working elements can be added later during a continuous manufacturing process with assembly of a carrier for the working elements, after completion and shipment to another manufacturer or assembly house for adding working elements to carriers on the tool core assembly, on a job site by adding working elements to carriers on the tool assembly, by adding preassembled carriers having working elements onto an assembled tool core assembly as part of the original manufacturer, by another manufacturer or assembly house, on a job site, or by adding preassembled carriers as replacement assemblies. A tool core assembly may, but need not, include carriers for working elements as part of the tool core assembly, while it will be understood that a complete working tool will include a tool core, and carriers having working elements thereon. The present description will be made in the context of the tool core 500 being for a stone or concrete cutting blade where the working elements are diamond matrix segments or similar working elements for stone or concrete, and wherein the tool core, carriers and working elements thereon are mounted on a conventional machine (not shown) as would be understood to those of ordinary skill in the art.

The tool core 500 can take a number of configurations. In the present examples, the tool core is a laminate structure having at least two structural layers having a plurality of portions secured to each other. In the illustrated examples, the laminate structure includes a first outer layer 504 on a first side of the tool core and a second outer layer (not shown) on a second or opposite side of the tool core. In the present examples, the first and second outer layers are substantially identical, and can be mirror images of each other. In one example, the outer layers can be monolithic and planar layers such as stainless steel sheets. In another example, the outer layers can be monolithic and embossed layers formed from stainless steel sheets. In a further example, the outer layers can be formed from a plurality of layer segments or layer sections assembled to form respective layers of the laminate structure. In the latter further example, where the outer layers are formed from layer segments or layer sections, they can be formed from raw stock material as desired, but in other examples the layer segments or layer sections can be formed and assembled in ways described in WO 2015/138509, the disclosure of which is incorporated herein by reference. Alternatively, the outer layers can be formed from combinations of any one or more of the foregoing.

In the illustrated example, each outer layer of the tool core is formed from a primary arcuate section 506 and a secondary arcuate section 508 configured in the geometry and assembled in the arrangement illustrated in FIGS. 1-4 and 6. In the illustrated configuration, the tool core 500 includes nine primary arcuate sections 506 and nine secondary arcuate sections, but it is understood that other geometries, numbers and combinations can be configured as desired. In the illustrated configuration, each primary arcuate section extends from an inner surface 510 to an outer bearing edge 512. The assembly of inner surfaces 510 of all of the primary arcuate sections form an opening 514 for receiving a drive shaft (not shown) of a machine for driving the saw blade. The saw blade may be secured on a drive shaft by fasteners extending through openings 516 formed in the core. Other mounting arrangements may be used. In the illustrated example, the blade is mounted on the driveshaft and secured for counterclockwise rotation as viewed in FIG. 1 (clockwise rotation as viewed in FIG. 2), while it should be understood that rotation in either direction is possible.

Each of the secondary sections 508 extend from an inner portion 518 located on a radius of the circular tool core approximately half way between the center and the perimeter to an outer bearing edge 520. The primary and secondary sections can be assembled so that the adjacent ones form at least in part a common outer bearing edge. In the present example, one primary and parts of two adjacent secondary sections 506 and 508 combine to form a single, straight outer bearing edge for a single carrier section, and wherein the primary section 506 has all of its outer edge contributing to a single outer bearing edge, wherein a small portion of the adjacent secondary section 508 in the clockwise direction contributes to the same outer bearing edge for the respective single carrier section, and the remainder of which contributes to an adjacent outer bearing edge for an adjacent carrier section. The secondary section adjacent the primary section in the counterclockwise direction has a large percentage of its outer edge contributing to the outer bearing edge for the first-mentioned carrier section, and a smaller percentage of its outer edge contributing to the outer bearing edge adjacent in the counterclockwise direction for the adjacent carrier section. Similarly, the primary and secondary arcuate sections combine to make up other outer bearing edges, in the present example combining to provide nine outer bearing edges. More or fewer outer bearing edges may be provided, in one example as a function of core diameter, and arcuate sections can be positioned or configured in other arrangements to define the desired outer edge configuration. In the illustrated configuration, the primary and secondary arcuate sections can be assembled in pairs, and the foregoing description applies to all of the primary and secondary sections. All of the primary and secondary arcuate sections in the present example are substantially thin plates having a substantially constant thickness, so that each side of the tool core is substantially flat over the area occupied by the primary and secondary arcuate sections. Additionally, the description of the first outer layer also applies to the second outer layer.

The first and second outer layers can be secured to each other by securing respective ones of the primary and secondary sections, by adhesives, welding, mechanical fasteners, or other fastening means. In the illustrated configuration, the primary and secondary sections are secured to each other through rivets, other mechanical fasteners or welding through inner openings 522, intermediate openings 524 and outer openings 526 distributed around respective portions of the tool core. Alternatively, the openings can be omitted in favor of other securement configurations, including for example adhesive or other bondings.

Alternative to or additional to securement of the first and second layers to each other through the openings 522, 524 and 526, the primary and secondary sections are adhered to corresponding facing surfaces of a medial or inner layer or layers between the first and second outer layers. In the present configurations, the first and second outer layers are secured to a single inner layer, also referred to herein as a medial layer, but it is understood that multiple structural layers can be positioned between first and second outer layers of the tool core. Adhesive layers are not shown, but it is understood that adhesive layers can be applied to fixed or stationary components of the medial layer, or facing surfaces of adjacent layers where multiple layers extend between the first and second outer layers. With a medial layer in the present example, adhesive is applied to both sides of the medial layer to assist in securing the first and second outer layers to the medial layer.

When a medial layer is used, for example in the configuration shown in FIGS. 2-9, the medial layer provides structural support to the core. In the present example, the medial layer 600 (FIG. 2) includes a plurality of medial portions 602. In the present example, the medial layer includes 9 medial portions 602, each of which are substantially planar or flat, but other combinations may be used. Each medial portion provides structural support to adjacent portions of the first and second outer layers, for example through the openings 524 and 526, and also by adhesive spread across substantially the entire side faces of each medial portion 602 to which is adhered adjacent portions of the primary and secondary arcuate sections. As noted above, adhesive layers are not shown, but they can be considered as being coextensive with the perimeters of each medial portion and extending inwardly therefrom on each face. Each medial portion helps to withstand radial loading on the blade during operation, as interior surfaces bear against the adjacent spars 702 (described more fully below), which in turn rest against a control element, in the present example in the form of a cam plate 704, and the cam plate pivots on and is supported by a central support plate 604. It is understood that the medial layer 600 can include the movable parts 702 and 704, but the spars 702 and the cam plate 704 are numbered to represent movable medial elements.

The support plate 604 is substantially circular and includes the securement openings 522 and mounting openings 516, and surrounds the arbor opening 514. The support plate is a fixed portion of the core. In the present example, the support plate includes a cavity 606 in a perimeter portion of the support plate for receiving and supporting a spur gear 706. The spur gear is fully supported by the support plate, and does not include in the present example a support axis. The spur gear allows a user or operator to move the cam plate 704 and the spars 702, as described more fully below. The support plate 604 further includes a radial channel for receiving a locking or latching element 608. The locking element 608 locks the moving components in one or another of two positions, as described more fully below. The locking element may include a spring 610 biasing the locking element radially outward, and the locking element may also be biased outward by centrifugal force during operation.

Each medial portion includes intermediate side surfaces and perimeter surfaces having various functions in the present example. Side surfaces will be identified for convenience as leading or trailing side surfaces in a configuration where the core as illustrated in FIG. 2 would rotate clockwise, but the same edges will be trailing or leading, respectively, if the blade core rotated counterclockwise in the configuration illustrated in FIG. 2. Therefore, the terms leading and trailing are used in this description solely for purposes of identification relative to the illustrations. In the present example, all of the medial portions are identical, and only one is described in detail herein. The medial portion 602 includes a substantially straight trailing edge surface 612 (FIG. 4) extending approximately but not precisely on a radius (slightly off a diameter). The straight trailing side surface can provide a bearing surface for an adjacent spar 702, for example when the spar 702 is moved to a substantially fully extended configuration (see FIG. 6). The straight trailing side surface 612 extends approximately half way from an inner side surface 614 adjacent and approximately contacting the cam plate 704 to an outer perimeter wall 616. At approximately half way, a cavity 618 is formed with a substantially transversely extending bearing wall 620 and an outwardly-extending support wall 622. The bearing wall 620 supports a retainer or retaining element that retains a respective carrier section, and the support wall 622 supports and guides movement of an adjacent surface of the retaining element.

The medial portion 602 includes a non-radial retainer support wall 624, substantially conforming to an adjacent edge geometry of an adjacent retainer. The support wall 624 helps to support the retainer against radial and tangential loading.

Figure 5:
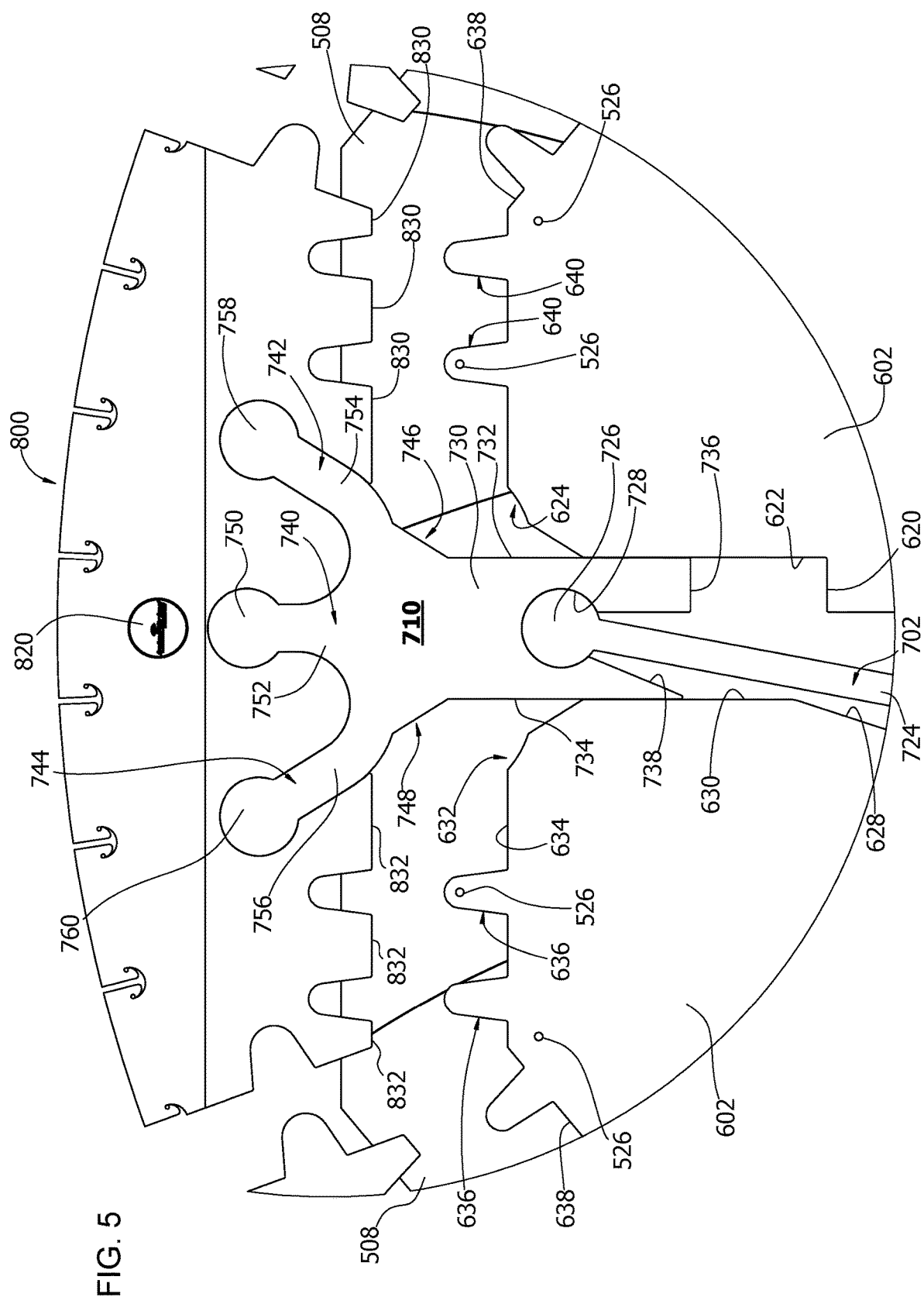
FIG. 5 is a detail view of a portion of the tool core of FIG. 4 taken at 5, and showing a portion of a linkage, a retainer and a carrier.

A leading edge of each medial portion 602 includes an inner wall 626 that extends at a first acute angle from the inner side surface 614, and transitions to a second wall 628 at a second acute angle greater than the first acute angle. The second wall 628 helps to guide the adjacent spar 702 inward. The second wall 628 transitions to a straight outer wall 630 substantially parallel to the oppositely-facing wall 622 (FIG. 5). The outer wall 630 helps to guide and laterally support the adjacent retainer. The outer wall 630 terminates at a non-radial retainer support wall 632, which helps to support the retainer against radial and tangential loading. The support wall 632 has a profile substantially conforming to an adjacent edge geometry of the adjacent retainer.

Figure 6:
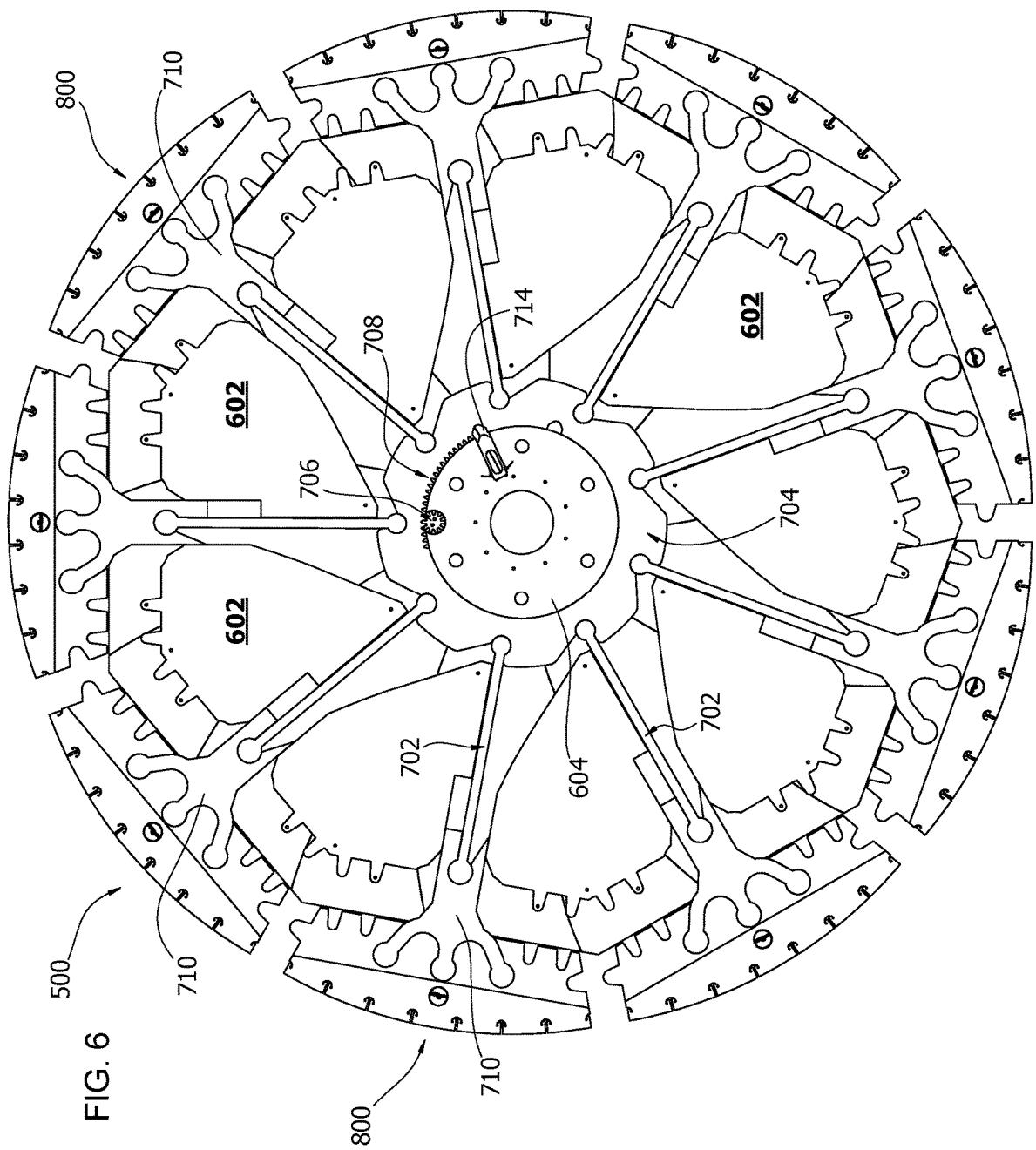
FIG. 6 is a back plan view of the tool core of FIG. 1 similar to that of FIG. 2 with a plurality of tool core components moved, for example to a fully disengaged configuration for the carriers.

Each medial portion 602 includes a loading support wall 634. In the present example, the loading support wall 634 extends substantially straight from the retainer support wall 632. In the present examples, the loading support wall 634 extends in a direction substantially perpendicular to a radius of the core, which in the present configurations is also perpendicular to an adjacent spar 702 when the adjacent spar is fully extended (FIG. 6). The loading support wall 634 includes a plurality of parallel and collinear sections separated by carrier engagement projections 636. In the illustrated example, the carrier engagement projections 636 extend substantially perpendicular to the loading support wall 634. Each is substantially symmetrical about a central axis of the projection. Each projection has a leading and trailing sidewall extending upward from the loading support wall 634 converging to a semicircular tip. In the present example, the loading support wall 634 includes two projections. One of the projections includes a securement opening 526.

Each medial portion 602 includes a loading support wall 638 adjacent the loading support wall 634, and trailing the loading support wall 634 as presently described. The loading support wall 638 extends substantially straight and includes a plurality of co-linear sections, extending substantially perpendicular to a radius, and also collinear with a loading support wall 634 on an adjacent medial portion 602. The collinear sections on the support wall 638 are separated by corresponding carrier engagement projections 640. The projections 640 extend substantially perpendicular to the support wall 638 and are symmetric about respective central axes of the projections. Each projection includes converging sidewalls and semi-circular tips connecting the sidewalls. The projections 636 and 640 help to retain and support an adjacent carrier section, described more fully below. The loading support walls 634 and 638 can have any number of profiles, and extend in a number of directions relative to a radius of the core. In the present configuration, the loading support walls extend substantially perpendicular to a direction of movement of the adjacent retainer for a corresponding carrier section.

Adjacent medial portions are configured or spaced apart from each other sufficiently to allow desired motion of movable elements positioned adjacent or between them, and in the present examples to support the movable elements as desired. In the illustrated examples, spacing between adjacent medial portions permits both radial and arcuate movement of the spar 702 between them. Also in the illustrated examples, spacing between adjacent medial portions permits radial movement of the respective carrier 710.

The core includes a plurality of movable elements 700, including a plurality of spars 702, the cam plate 704 and the spur gear 706. The movable elements can be controlled by the user or operator to move within the core so that replaceable elements such as the carrier sections 800 (FIGS. 1-7 and 10-12) can be placed and removed as desired. In the present example, the cam element 704 includes an inside diameter substantially the same as the outside diameter of the support plate 604 with a clearance sufficient to permit movement of the cam plate 704 about the support plate 604. An interior perimeter 707 (FIG. 2) of the cam plate includes a plurality of teeth 708 for engaging with the spur gear 706. The teeth 708 extend along a sufficient portion of the interior perimeter 707 to allow the desired amount of pivoting movement of the cam plate, and therefore movement of the spars 702 and retainers 710.

The interior perimeter 707 of the cam plate also includes a first latch receptacle 712 at one position on the interior surface of the cam plate, and a second latch receptacle 714 at a second position on the interior surface of the cam plate. Each of the first and second latch receptacles have geometries or profiles sufficient to receive the latching element 608 to permit secure latching of the cam plate relative to the support plate 604. The first latch receptacle 712 secures the cam plate 704, the spars 702, the retainers 710 and their respective carrier sections 800 securely in and on the blade core for operation. In one configuration, described more fully below, the latching element 608 in the first latch receptacle 712 places the cam plate and spars in an over-center configuration securely seating and pre-loading the retainers 710 against the adjacent medial portions 602 and the carrier sections 800 against corresponding loading support surfaces 634 and 638 and edge surfaces 512 and 520. In the over center configuration, each of the spars are placed in tension, for example by bearing against the adjacent side surfaces 626 and 628 of the medial portions. The over center configurations are represented in FIGS. 2 and 3.

The cam plate includes an outer perimeter having a plurality of retaining cavities 716 (FIG. 4) with a leading spar surface 718 and a trailing spar surface 720. The leading spar surface 718 is substantially straight and extends at an angle to a radius outward from the respective retaining cavity 716. The leading spar surface 718 bears against the adjacent spar 702 (FIGS. 2-3) when the latch 608 is in the first latch receptacle 712 to hold all the moving components and the carrier sections in place. The spar and therefore its interconnected or inter-engaging components are loaded, stressed or otherwise placed in a non-relaxed or higher energy configuration (as opposed to a lower energy configuration, or lower or no stress). The trailing spar surface 720 bears against the adjacent surface of the respective spar 702 when the spars and retainers are fully extended, for example as illustrated in FIG. 6. The retaining cavities 716 have a profile and/or geometry configured to retain a corresponding spar end in the cavity in the plane of the medial elements, while allowing lateral insertion and removal of the spar in the cavity. In the present examples, the retaining cavities are all co-planar, and also co-planar with the spars, which spars are co-planar with the core plates or medial plates, and with the retainers or retaining elements. Consequently, pivoting of the cam plate counterclockwise (as viewed in FIGS. 2-6) when the spars and retainers are fully extended will pull the spars and retainers inward, for example due to engagement of the spars in the retaining cavities.

The cam plate 704 includes nine retaining cavities 716, corresponding to each of nine respective spars 702. Each spar 702 includes a cam engagement end 722 (FIG. 4) having a substantially circular profile complementary to the partial circular profile of the corresponding retaining cavity. In the present examples, all of the retaining cavities have the same profiles, but they can be different to accommodate different spars. Each bar includes a substantially longitudinally extending and straight shank 724 extending outward to a retainer engagement end 726. In the present example, the retainer engagement end 726 is larger than the cam engagement end 722. The retainer engagement end 726 is retained in a complementary cavity 728 in the retainer 710 sufficiently to retain the retainer engagement end 726 during normal operation while allowing lateral insertion and removal of the spar from the cavity 728.

The retainer 710 includes a body 730 (FIG. 5) having substantially straight sidewalls 732 and 734 dimensioned to closely fit in and slide along the adjacent surfaces 622 and 630, respectively, of the adjacent medial portions 602. The bottom portion of the body 710 terminates at a transversely extending wall 736 that is substantially parallel to and bears against the bearing wall 620 when the retainer 710 is seated against the bearing wall. The body portion also includes an angled wall 738 for accommodating movement of the spar relative to the retainer.

The retainer 710 can take a number of engagement configurations for engaging a corresponding carrier section 800. The retainer 710 can absorb loading during normal operation and help to retain the carrier section 800 in place during normal operation. The retainer 710 also permits addition and removal of the carrier section when the retainer and corresponding spar are extended, for example fully extended. In one configuration, the retainer 710 includes a plurality of elements for retaining the carrier section and for absorbing loading during normal operation. In the illustrated configuration, the retainer includes a central post 740 and leading and following arms 742 and 744 on opposite sides of the central post 740, and in the present example equally spaced therefrom. The arms 742 and 744 are symmetric about the central arm 740 in the present example. The leading arm 742 and the adjacent body portion include a surface configuration 746 substantially corresponding to the edge configuration of the adjacent wall portion 624 on the corresponding adjacent medial portion 602. The trailing arm 744 and the adjacent body portion include a surface configuration 748 substantially corresponding to the edge configuration of the adjacent wall portion 632 on the corresponding adjacent medial portion 602. These surfaces help to support and absorb loading on the retainer 710 and therefore the carrier section 800.

The central arm 740 includes an enlarged retaining head 750 mounted on a substantially straight base 752. The enlarged retaining head 750 is substantially partial circular for laterally receiving the corresponding carrier section with a complementary opening. The central arm 740 can take a number of other profiles and configurations. The adjacent leading and trailing arms curve outwardly from the body 732, and include respective straight arms 754 and 756, each of which terminate at respective enlarged heads 758 and 760. In the present example, the enlarged retaining heads 758 and 760 have the same structure and function as the retaining head 750. Alternatively, they can have structures and profiles different from those of the central arm, and different from each other.

Each carrier section 800 includes geometry elements complementary to adjacent surfaces having respective functions. In one example, a geometry configuration helps to retain the carrier section on a corresponding retainer 710, and in another example, geometry configurations help to transfer loading to corresponding surfaces and structures on the core. Similarly, geometry configurations help to absorb and/or transmit loading between adjacent carrier sections. In the illustrated embodiment, the carrier section 800 (FIGS. 10-12) includes a perimeter portion 802 having perimeter surfaces 804 for receiving and securing working elements, such as segments 502 (FIG. 1). In the present example, the perimeter portion includes a plurality of gullets 806 having conventional structures and functions. The carrier section extends from a leading end portion 810 to a trailing end portion 812, starting and terminating at respective gullets. The perimeter portion includes a curvature, so that the carrier section can accommodate working elements in such a way that the working elements can be mounted at any position along the perimeter portion. The perimeter portion extends inwardly to a transversely extending first bearing wall 814, on a first side of the carrier section and a second bearing wall 816 on an opposite side of the carrier section. The first and second bearing walls are configured to contact and bear against the adjacent outer bearing edges 512 and 520 on the first and second outer surfaces. The perimeter portion may, but need not, include an opening 818 for receiving an additional component 820, which may take a number of configurations, including an identification component, an identification chip, an RFID component, a light source or light-emitting device, or the like.

The leading and trailing end portions 810 and 812 are configured to be complementary to adjacent ones of respective adjacent carrier sections. The leading end portion 810 includes an angled surface wall 822 extending at an angle that is substantially on a radius of the core containing the angled surface wall 822 when the carrier section is fully seated against the core. The angled surface wall 822 extends from the adjacent gullet inwardly to a corner surface 824. A cavity 826 is formed in the angled surface wall 822 and extends inward from the wall 822 into a support structure 828 of the carrier section 800. The cavity 826 is complementary to and receives a projection on an adjacent carrier section. The support structure 828 of the carrier section includes structures to retain the carrier section and to transmit loading from the working elements to the core. The side walls of the outer plates or outer laminates also provide lateral support to the support structure 828, and therefore the carrier 800.

In the present example, the support structure 828 includes a plurality of bearing walls 830 and 832, respectively. The bearing walls 830 extend parallel to the first bearing wall 814 and second bearing wall 816, and also parallel to the bearing walls 638 (FIG. 5). The bearing walls 830 are configured and sized so as to reliably contact the adjacent bearing walls 638 along their entire surfaces on the corresponding medial portion 602. The support structure 828 also includes a plurality of cavities 834 substantially conforming to and sized to contact substantially the entire surfaces of the adjacent projections 640 on the corresponding medial portion 602. In this way, loading on the working portions on the carrier section is reliably transmitted through the support structure 828 to the adjacent medial portion 602. Similarly, loading from the working elements is also transmitted to the first and second outer layers through the bearing walls 814 and 816.

The bearing walls 832 are configured and sized so as to reliably contact the adjacent bearing walls 634 along their entire surfaces on the corresponding medial portion 602. The thickness of the support structure 828 and the spacing or gap between the adjacent sidewalls 504 and 508 are configured and sized so that the adjacent sidewalls also provide lateral support to the support structure 828 and thereby to the carrier 800. The support structure 828 also includes a plurality of cavities 836 substantially conforming to and sized to contact substantially the entire surfaces of the adjacent projections 636 on their corresponding medial portion 602. Similarly, loading on the working portions on the carrier section is reliably transmitted through the support structure 828 to the medial portion 602 adjacent the cavities 836.

The trailing end portion 812 includes an angled surface wall 838 extending at an angle that is substantially on a radius of the core containing the angled surface wall 838 when the carrier section is fully seated against the core. Wall 838 extends from the adjacent gullet inwardly to a corner surface 840 and includes an outwardly extending projection 842 for extending into and contacting substantially all of a complementary cavity 826 in an adjacent carrier section 800. The complementary cavities 826 and projections 842 help to interlock adjacent carrier sections, guide them into place as they are moved simultaneously inwardly, and help to absorb lateral and radial loading.

The support structure 828 includes one or more cavities 844 complementary to arms on the retainer 710. In the present example, the cavity 844 is a single cavity having a plurality of branches 846, 848 and 850. The branch 846 is a center branch corresponding to the central arm 740 of the retainer, and includes a central cavity 852 terminating in a partially circular opening 854 for receiving and retaining the enlarged head 750. The branch 848 includes a substantially straight portion 856 extending at an angle and terminating at a partially circular cavity 858 for receiving and retaining the enlarged head 758 of the leading arm 754 of the retainer. The branch 850 includes a substantially straight portion 860 extending at an angle and terminating at a partially circular cavity 862 complementary to and receiving the enlarged head 760 of the trailing arm 744. The illustrated carrier section 800 can be mounted onto and engage the retainer 710 by moving the carrier section laterally over the arms of the retainer until the support structure 828 is coplanar with the arms of the retainer 710. When all of the carrier sections are mounted onto their respective retainers 710, the cam plate 704 can be pivoted so as to draw the spars 702 inward, pulling the retainers 710 radially inward and along the adjacent walls of the corresponding medial portion 602. As the cam plate continues to pivot, the retainers and their corresponding carrier sections move inward until such time as the surfaces 746 and 748 contact the corresponding surfaces 624 and 632, the cavities 834 and 836 extend over and engage the corresponding projections 640 and 636, the bearing surfaces 830 and 832 contact the corresponding bearing surfaces 638 and 634, and the edges 814 and 816 contact the corresponding outer bearing edge is 512 and 520.

Figure 4:
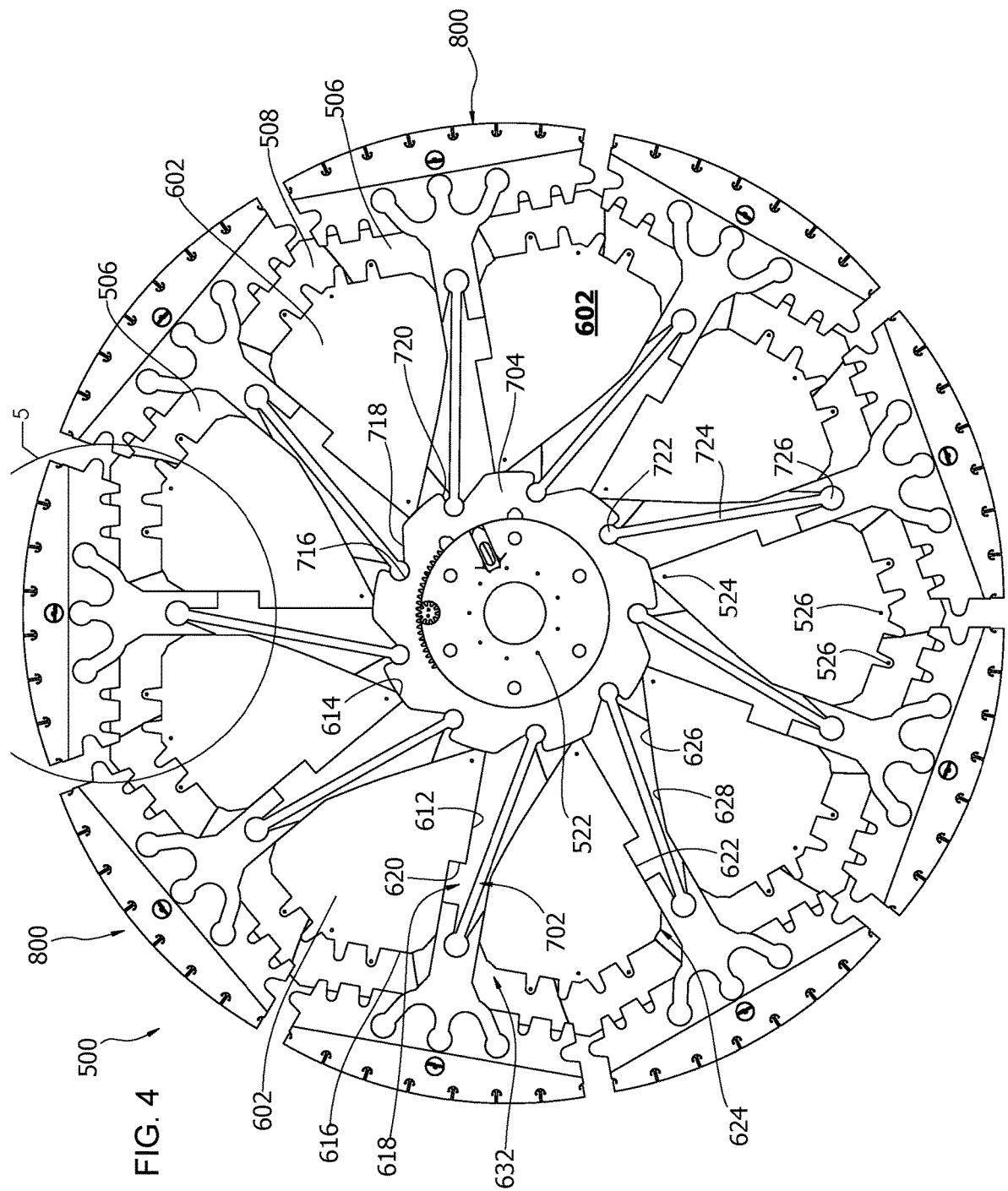
FIG. 4 is a back plan view of the tool core of FIG. 1 similar to that of FIG. 2 with a plurality of tool core components moved, for example to disengage carriers from the tool core such as carriers for working components.

In operation, a spanner wrench or other suitable tool can be used to turn the spur gear 706 (FIGS. 1-2, 4, and 6-7) to move the cam plate 704, spars 702 and retainers 710 and their corresponding carrier sections 800 from the secured and locked or working configurations shown in FIGS. 1-3 to begin moving the spars, retainers and carrier sections outward as represented in FIG. 4. In FIG. 4, the cam plate has moved approximately half way from the locked configuration to the unlocked configuration. As the spur gear is continued to be rotated, the assembly reaches the configuration illustrated in FIG. 6, where the latch 608 is aligned with the second latch cavity 714, which can be used to secure the assembly in an open or releasable configuration. In this configuration, the spars 702 rest against the adjacent straight surfaces 612 of the corresponding medial portions 602, and the retainers 710 and their corresponding carrier sections 800 are fully extended. As can be seen in FIG. 6, the bottom edge portions of the carriers have cleared the outermost edges of the outer layers, the second outer layer being visible in FIG. 6. In this configuration, each of the carrier sections can be moved laterally to disengage from their corresponding retainers 710. New or replacement carrier sections can then be installed, or the original carrier sections reinstalled. New or replacement carrier sections can have the same configuration as the carrier sections just removed, or can be larger or smaller, have different working elements, which may be wider, higher, different matrix or working surface, or otherwise. Once the desired configuration has been assembled, the latch 608 can be released and the spur gear 706 turned in the opposite direction to move the cam plate back to the configuration shown in FIG. 7.

Figure 8:
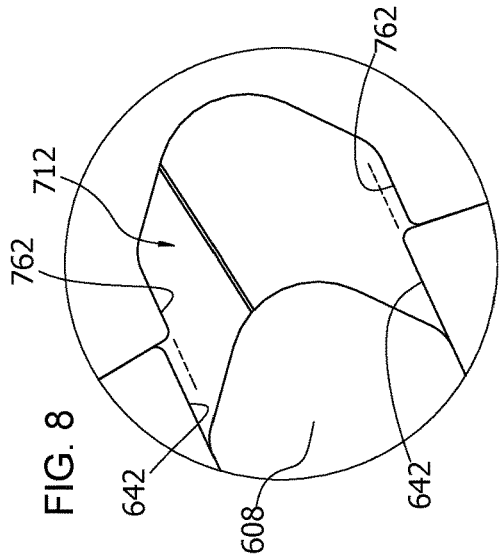
FIG. 8 is a detail view of a portion of the tool core of FIG. 7 taken at 8 showing a relative positioning of a cam plate or ring and a cam pivot, corresponding to a neutral or relaxed configuration.
Figure 9:
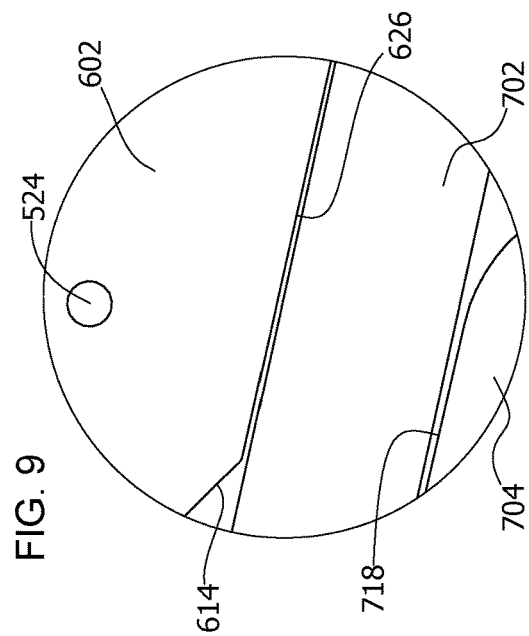
FIG. 9 is a detail view of a portion of the tool core of FIG. 7 similar to the view of FIG. 3 and showing a linkage in a neutral or relaxed configuration.
Figure 7:
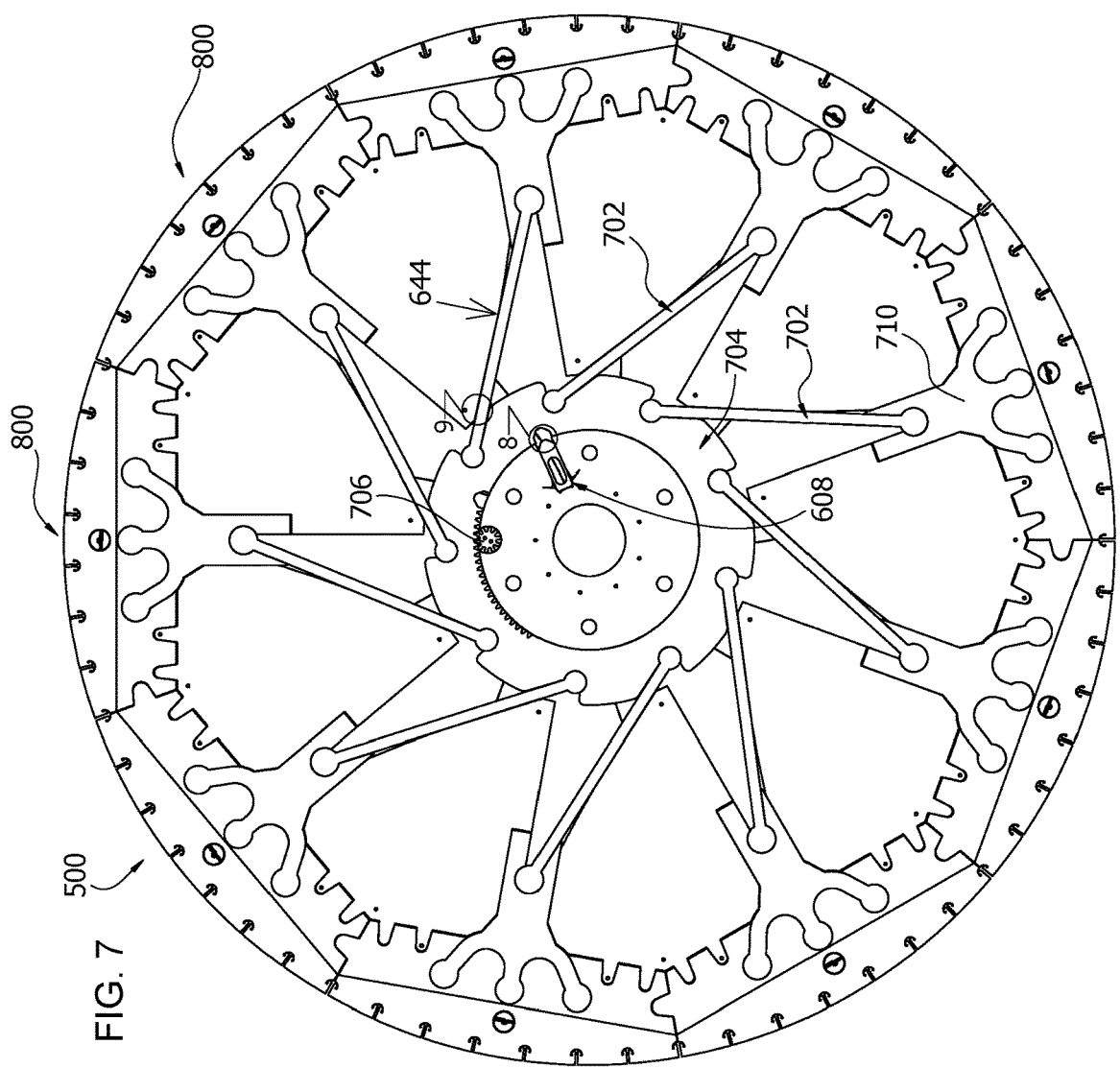
FIG. 7 is a back plan view of the tool core of FIG. 1 similar to that of FIG. 2 with a plurality of tool core components moved to and engaged configuration, for example with the carriers engaged with the tool core, in a neutral or relaxed configuration.

In the configuration shown in FIG. 7, the cam plate has been turned sufficiently so that the carrier sections have contacted their adjacent surfaces, the retainers have seated against their bearing surfaces 620, the spars 702 have approached and/or contacted their adjacent surfaces of the respective medial portions 602 and the latch 608 is adjacent the first cavity 712. They are in an approximately relaxed configuration. However, as shown in FIG. 8, the latch 608 is not exactly aligned with sidewalls 762 of the cavity 712, or in other words sidewalls 642 housing the latch 608 are not aligned with the sidewalls 762. Additionally, the spar 702 (FIG. 9) is not intimately in contact with the first angled surface 626 of the adjacent medial portion 602, and the adjacent wall 718 of the cam plate 704 is not bearing against the spar in the manner shown in FIG. 3. By further rotation of the spur gear 706, the walls 642 are brought into alignment with the walls 672 (FIG. 8), as illustrated in FIG. 2, and the adjacent first angled surface 626 is brought into contact with and bears against the adjacent surface of the spar 702, illustrated in FIG. 3. Additionally, loading 644 occurs in the area indicated in FIG. 7 by the adjacent surface of the medial portion 602, placing the adjacent spar in tension. All of the spars are placed in tension, the cam plate is preloaded, the retainers 710 are preloaded against their adjacent surfaces, and the carrier sections are preloaded against their adjacent surfaces. As a result, loading during normal operation when the blade operates in the clockwise direction tends to keep all the components in their preloaded conditions/configurations.

Having thus described several exemplary implementations, it will be apparent that various alterations and modifications can be made without departing from the concepts discussed herein. Such alterations and modifications, though not expressly described above, are nonetheless intended and implied to be within the spirit and scope of the inventions. Accordingly, the foregoing description is intended to be illustrative only.

What is claimed:

1. A removable carrier for one or more working elements for a working tool, the removable carrier configured to be removably supported on a tool core for forming the working tool, the removable carrier comprising a working body portion configured to receive working elements used by a working tool for working a workpiece, and a support portion coupled to the working body portion wherein the support portion includes first and second opposite side surfaces, and wherein the first side surface includes a geometry different from a geometry of the second side surface such that first and second removable carriers placed side-by-side can move toward each other in a plane so that a first side surface geometry on the first removable carrier can fit with a second side surface geometry on the second removable carrier, wherein the support portion includes an edge surface opposite the working body portion wherein the edge surface includes a plurality of straight surfaces and a plurality of arcuate surfaces, and wherein the edge surface includes a plurality of walls defining a plurality of semicircular openings.

2. The removable carrier of claim 1 wherein the geometry of the first opposite side surface is complementary to a geometry of the second opposite side surface.

3. The removable carrier of claim 1 wherein the geometry of the first opposite side surface is a protrusion and a geometry of the second opposite side surface is an opening.

4. The removable carrier of claim 1 wherein the first side surface includes a radially extending surface with a projection and the second side surface includes a radially extending surface with a cavity.

5. The removable carrier of claim 1 wherein the first side surface and the second side surface are respectively leading and trailing end portions of the carrier.

6. The removable carrier of claim 5 wherein the first side surface and the second side surface include radially extending surfaces for which projecting lines converge at a center closer to the support portion than to the working body portion.

7. A removable carrier section for one or more working elements for a working tool, the carrier configured to be removably supported on a tool core for forming the working tool, the carrier comprising a working body portion configured to receive working elements used by a working tool for working a workpiece, and a support portion coupled to the working body portion configured for extending within elements of a tool body, wherein the support portion includes first and second end portions and an intermediate portion, wherein the intermediate portion includes surfaces for engaging portions on the tool body, and the first end portion includes a first surface configuration and the second end portion includes a second surface configuration complementary to the first surface configuration, wherein the support portion includes an edge surface opposite the working body portion wherein the edge surface includes a plurality of straight surfaces and a plurality of arcuate surfaces, and wherein the edge surface includes a plurality of walls defining a plurality of semicircular openings.

8. The removable carrier section of claim 7 wherein the first surface configuration is a projection outwardly from the first end portion and wherein the projection includes first and second projection side walls converging outwardly.

9. The removable carrier section of claim 7 wherein the first surface configuration is a projection extending outwardly from the first end portion and having first and second nonparallel projection sidewalls.

10. The removable carrier section of claim 9 wherein the first and second nonparallel projection sidewalls terminate at a convex end surface.

11. The removable carrier section of claim 9 wherein the first surface configuration is a projection approximately centered on the first end portion.

12. The removable carrier section of claim 9 wherein a line bisecting the removable carrier section intermediate the first and second end portions is nonparallel to a second line containing first and second surfaces of the first end portion.

13. The removable carrier section of claim 12 wherein the first end portion includes a projection having a third line bisecting the projection wherein the third line is substantially perpendicular to the second line containing the first and second surfaces of the first end portion.

14. The removable carrier section of claim 7 wherein the working body portion includes an outside surface that is substantially arcuate.

15. A removable carrier section for one or more diamond matrix working elements for a diamond cutting tool, the carrier configured to be removably supported on a core for a diamond cutting tool for forming the diamond cutting blade, the carrier comprising a working body portion having an arcuate surface for receiving one or more diamond matrix working elements, and a support portion coupled to the working body portion opposite the arcuate surface for extending between spaced apart planar elements of the core for the cutting tool wherein the support portion includes a plurality of surfaces defining at least one geometry for engaging a portion of the core, and first and second end portions at opposite ends of the support portion, wherein the first end portion includes a first surface configuration and the second end portion includes a second surface configuration complementary to the first surface configuration, wherein the support portion includes an edge surface opposite the working body portion wherein the edge surface includes a plurality of straight surfaces and a plurality of arcuate surfaces, and wherein the edge surface includes a plurality of walls defining a plurality of semicircular openings.

16. The removable carrier of claim 15 wherein the first surface configuration forms a projection having sidewalls converging to a projection end portion and the second surface configuration forms a cavity having sidewalls diverging outward.

17. The removable carrier of claim 16 wherein the first and second surface configurations are complementary.

18. The removable carrier of claim 15 wherein the removable carrier is one of a plurality of removable carriers, and further including a tool core having a medial assembly for engaging respective removable carriers and further including first and second spaced apart planar elements on opposite sides of the medial assembly for contacting and supporting adjacent portions of respective removable carriers.

* * * * *